Figure 4:
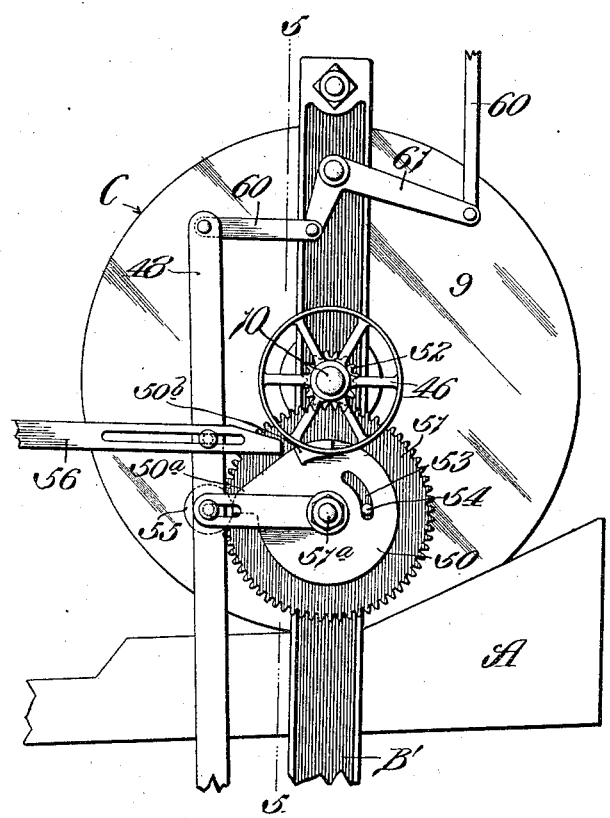

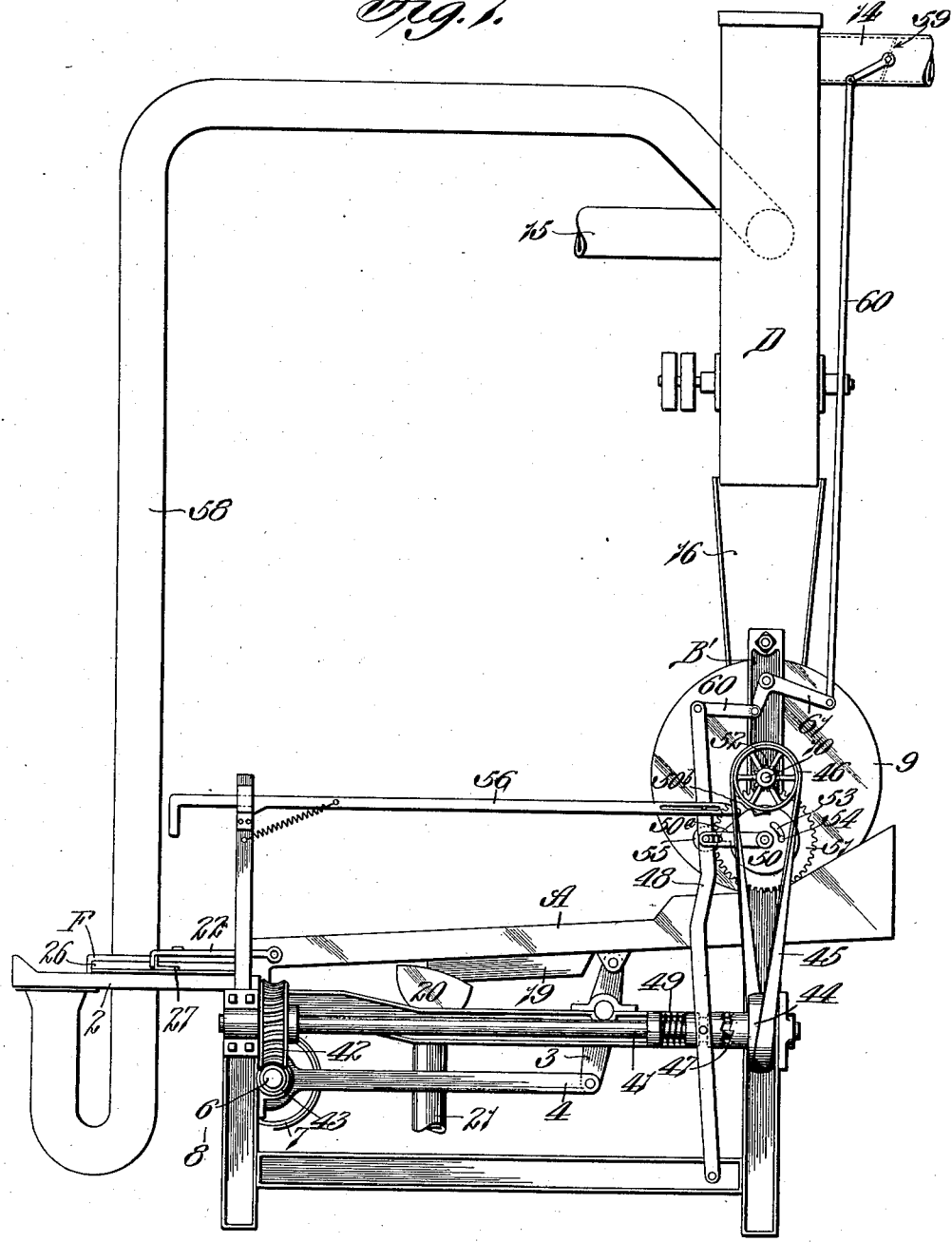

B. G. VAUGHAN.
MATCH SPLINT CLEANING AND ASSEMBLING MACHINE.
APPLICATION FILED MAR. 19, 1912.
1,072,882.
Patented Sept. 9, 1913.
5 SHEETS—SHEET 2.
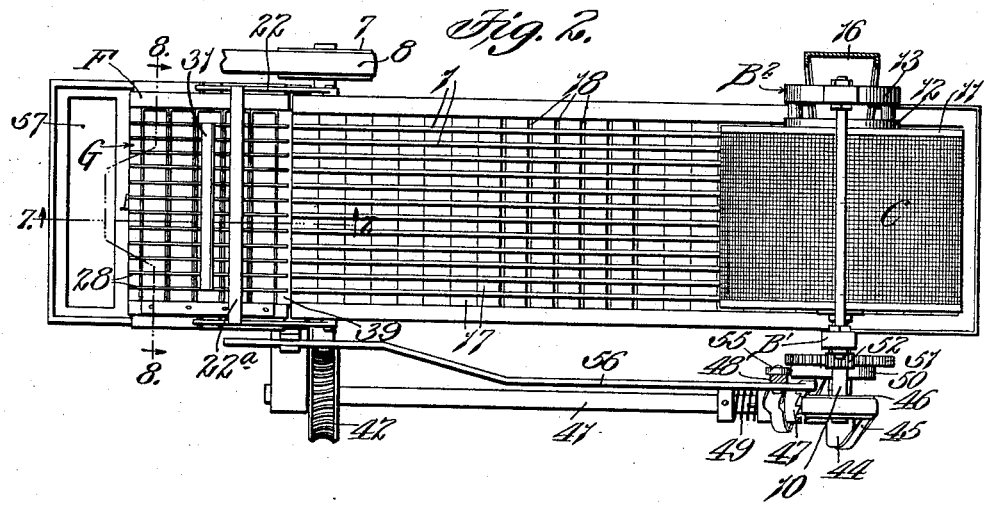
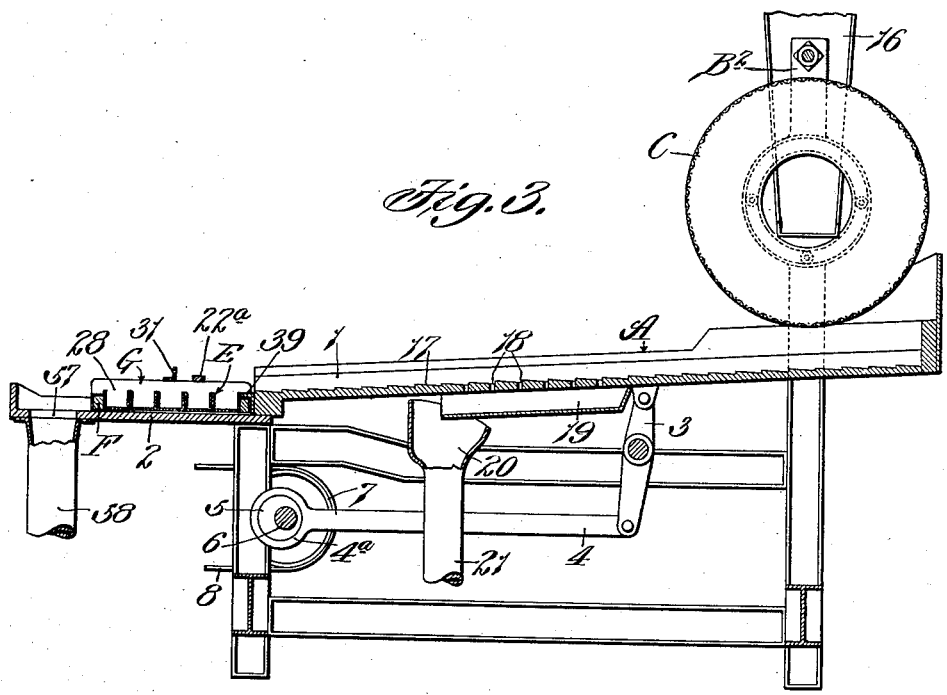

B. G. VAUGHAN.
MATCH SPLINT CLEANING AND ASSEMBLING MACHINE.
APPLICATION FILED MAR. 19, 1912.

1,072,882.

Patented Sept. 9, 1913.

5 SHEETS—SHEET 3.

Witnesses:
Geo. R. Ladson
C. M. Badger

Inventor,
Bernard G. Vaughan.
by Bakewell & Church attys.

B. G. VAUGHAN.
MATCH SPLINT CLEANING AND ASSEMBLING MACHINE.
APPLICATION FILED MAR. 19, 1912.
1,072,882.
Patented Sept. 9, 1913.
5 SHEETS—SHEET 4.
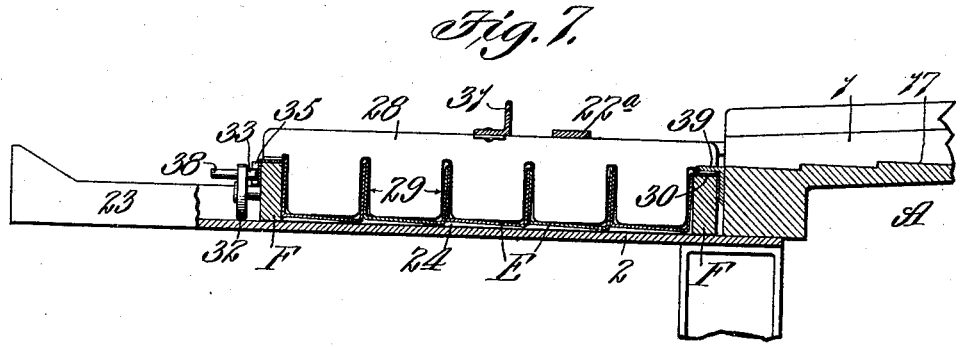
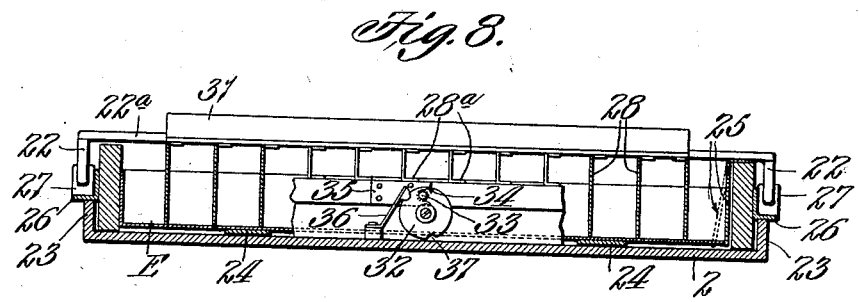
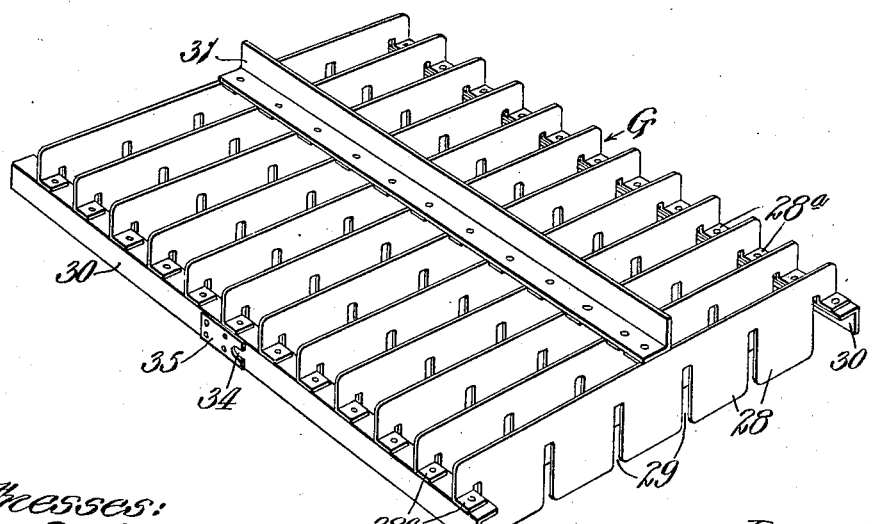

B. G. VAUGHAN.
MATCH SPLINT CLEANING AND ASSEMBLING MACHINE.
APPLICATION FILED MAR. 19, 1912.
1,072,882.
Patented Sept. 9, 1913.
5 SHEETS—SHEET 5.
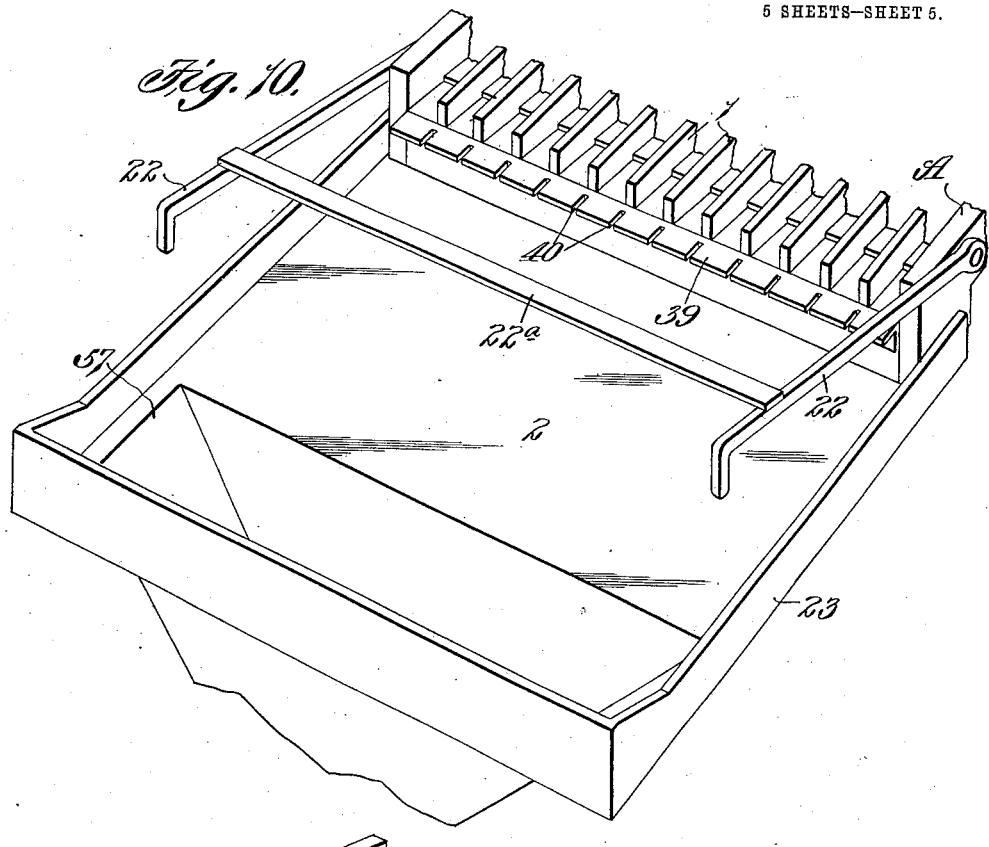
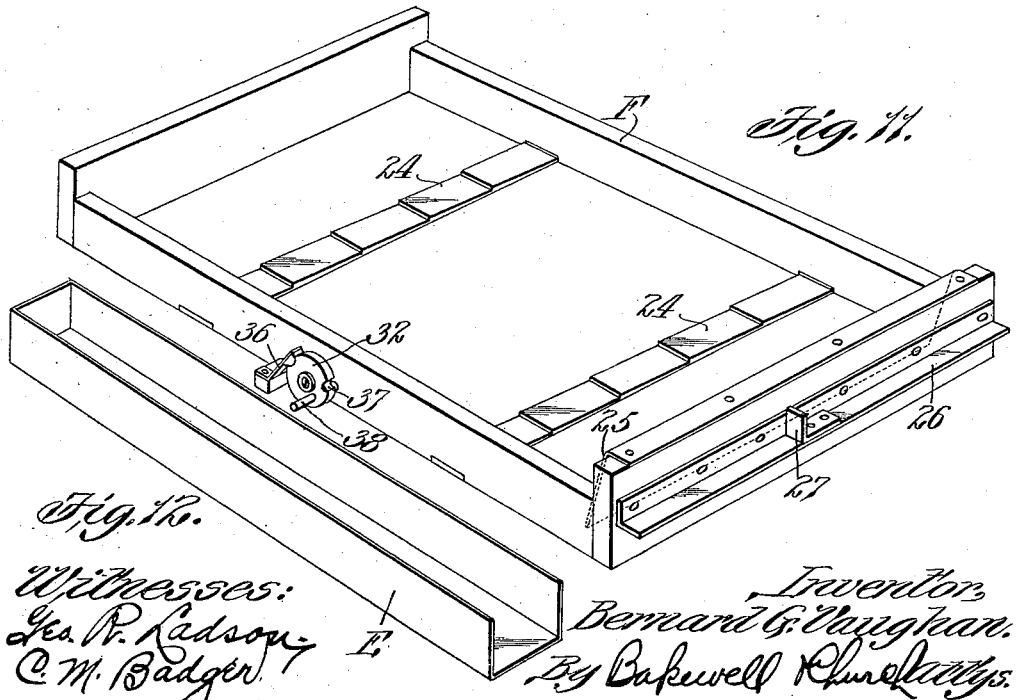
Witnesses:
Geo. R. Ladson
C. M. Badger
Inventor,
Bernard G. Vaughan.
By Bakewell
Attys.

UNITED STATES PATENT OFFICE.

BERNARD G. VAUGHAN, OF JOLIET, ILLINOIS, ASSIGNOR TO NATIONAL MATCH COMPANY, OF JOLIET, ILLINOIS, A CORPORATION OF ILLINOIS.

MATCH-SPLINT CLEANING AND ASSEMBLING MACHINE.

1,072,882.　　　　　Specification of Letters Patent.　　Patented Sept. 9, 1913.

Application filed March 19, 1912. Serial No. 684,669.

*To all whom it may concern:*

Be it known that I, BERNARD G. VAUGHAN, a citizen of the United States, residing at Joliet, Illinois, have invented a certain new and useful Improvement in Match-Splint Cleaning and Assembling Machines, of which the following is a full, clear, and exact description, such as will enable others skilled in the art to which it appertains to make and use the same.

This invention relates to machines that are used for assembling match-splints and arranging them in parallel relation to each other preparatory to introducing the splints into the hopper of a match-making machine.

One object of my invention is to provide a machine that will arrange match-splints in parallel relation to each other and automatically feed or introduce the splints into receptacles, which subsequently are emptied into the hopper of a match-making machine.

Another object is to provide a combined match-splint cleaning and leveling machine that is adapted to receive match-splints from a source of supply and which is so designed that it will separate the dust, dirt and short splints from the perfect splints and also arrange the perfect splints in parallel relation to each other.

Another object is to provide a machine of the character described which is so designed that the supply of splints is cut off automatically after a certain quantity of splints has been supplied to the means which causes the splints to be arranged in parallel relation to each other.

Another object is to provide a match-splint assembling and filling machine that comprises receptacles which are adapted to be removed from said machine after they have been filled with match-splints and subsequently emptied into the hopper of a match-making machine.

Another object is to provide a match-splint assembling and filling machine that comprises means of novel construction for causing the match-splints to lie properly in the receptacles into which they are introduced. And still another object is to provide a match-splint-supplying apparatus for match-making machines that automatically conveys match-splints from a source of supply and feeds them to a means which removes the dust and imperfect splints and introduces the perfect splints in an orderly manner into receptacles which subsequently are discharged or emptied into the hopper of the match-making machine.

Other objects and desirable features of my invention will be hereinafter pointed out.

Figure 5:
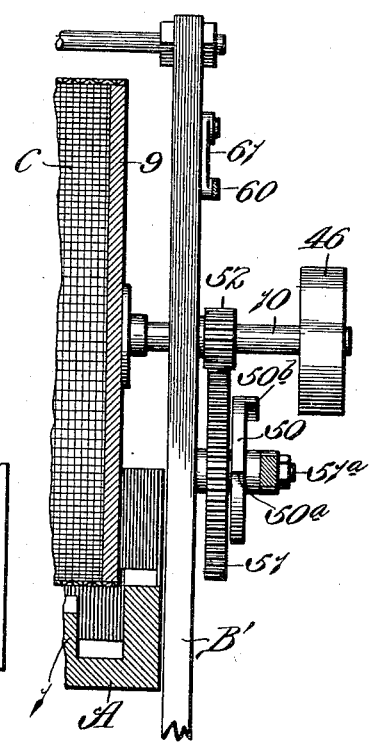
Figure 6:
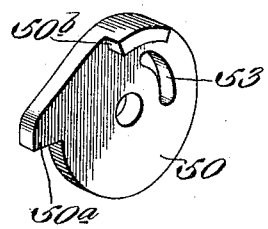

Figure 1 of the drawings is a side elevational view of a machine constructed in accordance with my invention for automatically assembling match-splints and introducing them into receptacles which subsequently are emptied into the hopper of a match-making machine; Fig. 2 is a top plan view of said machine; Fig. 3 is a vertical longitudinal sectional view of said machine; Fig. 4 is an enlarged side elevational view of the mechanisms for controlling the movement of the rotatable screen which delivers the match-splints onto the reciprocating table that arranges the splints in parallel relation to each other; Fig. 5 is a vertical sectional view taken on the line 5—5 of Fig. 4; Fig. 6 is a perspective view of the cam disk that actuates the clutch-shifting lever; Fig. 7 is an enlarged vertical sectional view taken on the line 7—7 of Fig. 2; Fig. 8 is an enlarged vertical sectional view taken on the line 8—8 of Fig. 2; Fig. 9 is a perspective view of the partition member that is used with the splint-receiving receptacles while said receptacles are being filled; Fig. 10 is an enlarged perspective view of the stationary table of the machine that forms a support for the frame in which the splint-receiving receptacles are arranged; Fig. 11 is a perspective view of said frame; and Fig. 12 is a perspective view of one of said splint-receiving receptacles.

Referring to the drawings which illustrate the preferred form of my invention, A designate a longitudinally reciprocating table which is provided with longitudinally extending partitions or ribs 1 that form a plurality of channels on the top face of the table. The table A is preferably inclined slightly, as shown in Figs. 1 and 3, and the lower end of same rests upon a stationary support 2 which may consist of a table, as shown in Fig. 3. The means herein shown for reciprocating the table A consists of rock arms or levers 3 pivotally connected at their upper ends to lugs on the under side of the table, and links 4 pivotally connected to said rock arms and provided with straps 4ª that surround eccentrics 5 on a horizontally disposed drive shaft 6 mounted in suitable bearings in the supporting framework B of the table and provided at one end with a pulley 7 around which a drive belt 8 passes, a suitable clutch, not shown, being provided for connecting the pulley 7 to the drive shaft 6 so as to enable the operator to discontinue the reciprocating movement of the table.

The match-splints are deposited on the table A by means of a rotatable cylindrical-shaped screen C whose meshes are of sufficient size to permit the match-splints to pass through same easily. The disk 9 which forms one of the end walls of the screen, as shown in Fig. 5, is rigidly connected to a horizontally disposed shaft 10 that is journaled in a stationary upright B' that forms part of the framework of the machine, and the other end wall 11 of said screen is provided with a ring-shaped track 12, as shown in Figs. 2 and 3, that receives rollers 13 which project laterally from a standard or upright B² at the opposite side of the screen, the end wall 11 of the screen being formed in this manner so as to permit the match-splints to be introduced into the screen, as hereinafter described.

Any suitable means may be used for feeding the match-splints to the screen C, but I prefer to use a vacuum chamber D that is connected by means of a pipe 14 with a suction fan, not shown, which causes the match-splints to be sucked from a source of supply through an intake pipe 15 into the vacuum chamber D, the splints falling downwardly through a discharge opening in the bottom of said vacuum chamber into an inclined chute 16, as shown in Figs. 1, 2 and 3, whose lower end projects into an opening at the center of the end wall 11 of the screen C.

The bottoms of the channels on the top face of the table A are preferably notched or provided with steps 17, as shown in Fig. 3, so as to assist the match-splints in traveling downwardly toward the discharge end of the table, and slots or openings 18 are formed in the table, as shown in Fig. 3, so as to permit the dust, dirt and short match-splints to become separated from the perfect splints and fall downwardly into a pan 19 on the under side of the table, said pan discharging into an enlarged mouth 20 on the upper end of a suction pipe 21 that leads to the boiler-room of the match plant in which the machine is used, thereby causing the dirt and imperfect match-splints to be conveyed away from the machine. The ribs 1 cause the match-splints to become arranged in parallel relation to each other, longitudinally of the table, and when the splints reach the discharge end of the table they pass into receptacles E which are mounted in a frame F that is detachably connected to the discharge end of the table A by any suitable means, such, for example, as latches 22, the frame F being slidingly mounted either on the table 2 or on tracks or rails 23 at the sides of said table.

The receptacles E preferably consist of long channel-shaped troughs which are open at one end and closed at the opposite end, as shown in Fig. 12, said receptacles being long enough so that they will extend across the entire width of the table A and thus receive splints from all of the channels in said table. The frame F in which the receptacles E are arranged preferably consists of a rectangular-shaped open frame provided with two cross-pieces 24, as shown in Fig. 11, that support the receptacles E which are arranged in said frame, the length of the frame F corresponding approximately to the width of the table A. If desired the top faces of the cross-pieces 24 of said frame may be notched or stepped, as shown in Fig. 11, so that the receptacle E located nearest the table will project slightly above the second receptacle from the end of the table, the second receptacle will project slightly above the third receptacle from the end of the table, and so on, thus causing the splints to travel across the frame F in the direction in which the table moves as the receptacles are filled progressively. In other words, the frame F is so designed that the splint-receiving receptacles E will be arranged therein in such a manner that the shaking or reciprocating movement of the frame causes the splints to travel across same instead of remaining on the pile of splints in the filled receptacles. In order to hold the receptacles E securely in the frame F I have provided said frame with a flexible or resilient portion 25 against which the open ends of the receptacles E bear when they are arranged in operative position in the frame, said resilient portion 25 preferably consisting of a piece of resilient sheet metal connected at its upper edge to one of the end pieces of the frame F and having its lower edge free or not connected to the frame F so that it will exert pressure on the receptacles E and thus tend to force them tightly against the other end piece of the frame F.

A retaining device of the kind above-described is inexpensive to manufacture, it holds the receptacles E securely in the frame F, and it permits said receptacles to be inserted and removed easily and without manipulating or adjusting any member of the structure. The end pieces of the frame F are provided with laterally projecting flanges 26 which may consist of short pieces of angle iron that rest upon the tracks or guides 23 on which the frame slides back and forth, and lugs or stops 27 are connected to said flanges so as to coöperate with the pivotally mounted latches 22 on the table A that secure the frame F to the end of the table A and cause it to reciprocate back and forth with said table. If desired, the latches 22 at the opposite sides of the table may be connected together by a cross-bar 22ª, as shown in Fig. 10, so as to cause said latches to operate simultaneously.

In order to overcome any tendency of the match-splints to assume an improper position in the receptacles E or a position other than extending transversely of said receptacles, I use a partition member G that subdivides each of the receptacles E into a plurality of small compartments that correspond in width to the width of the channels formed by the ribs 1 on the top of the table A. As shown in Fig. 9, the partition member G consists of a plurality of vertically disposed partitions 28 arranged parallel to each other and provided on their under sides with vertically disposed notches 29 that receive the vertical side walls of the receptacles E when the partition member G is arranged in operative position, as shown in Figs. 2 and 3. The partitions 28 are connected together by two cross-pieces 30 which preferably consist of pieces of angle iron arranged in such a manner that they will lap over the side pieces of the frame F when the partition member G is arranged in operative position in said frame. A reinforcing or strengthening member 31, which may also be used as a handle piece, is arranged transversely of the partitions 28 of the member G at approximately the middle of said member, and means is provided for securely locking the partition member G in the frame F. The locking means herein shown consists of a disk 32 oscillatingly mounted on the outer side-piece of the frame F, a pin 33 projecting laterally from said disk, as shown in Fig. 7, and adapted to enter a notch 34 in a plate 35 on the outer cross-piece 30 of the partition member G, and a spring latch 36 that coöperates with notches 37 in the edge of the disk 32 so as to lock it in adjusted position, said disk having two notches 37, one arranged in such a manner that the disk will be locked when the laterally projecting pin 33 thereon is in engagement with the latch plate 35, and the other located in such a position that the disk will be locked when the pin 33 is in an inoperative position. Said disk is preferably provided with a handle 38 that projects forwardly from the front side thereof so as to permit the operator to turn the disk easily into or out of operative position. It will, of course, be understood that any other suitable means could be used for locking the partition member G in the frame F but I prefer to use the means herein shown on account of its simplicity and the ease with which it can be operated. The partitions 28 of the partition member G preferably consist of strips of thin sheet metal, and the receptacles E are also preferably formed from sheet metal but it will, of course, be understood that it is immaterial so far as my invention is concerned, what particular material these members are formed of. In the construction herein shown the partition members 28 are provided with integral flanges 28ª which are riveted to the cross-pieces that connect said partition members together but it will, of course, be understood that the various elements of the partition member G could be connected together in various other ways.

The receptacles E are arranged longitudinally of the frame F, and the partition member G is thereafter placed in position and locked by means of the locking device 32. Thereafter, the frame F is mounted on the tracks or guideways 23 provided for same, and the latches 22 on the reciprocating table A are moved into engagement with the lugs 27 on the frame F so as to connect said frame to the table, the table A being preferably provided at its lower end or discharge end with a flange 39 having slots 40 that receive the ends of the partitions 28 of the partition member G so as to hold said partitions in alinement with the ribs 1 on the table A.

The longitudinally reciprocating movement of the table A causes the match-splints to be arranged in parallel relation to each other and fed into the receptacles E, and after said receptacles have become filled the operator stops the table A, removes the frame F with the filled receptacles, and subsequently empties said filled receptacles into the hopper of the match-making machine which the operator has charge of. Before he empties the filled receptacles, however, the operator connects another frame F containing empty receptacles and a partition member G to the table A so that said receptacles will be filled with match-splints while he is emptying the previously filled receptacles into the hopper of the match-making machine.

The machine is preferably so designed that the supply of match-splints to the reciprocating table A will be cut off automatically after enough splints have been deposited on said table to fill all of the receptacles in one of the frames F. The means herein shown for accomplishing this consists of mechanism that causes the screen C to stop or come to rest automatically after it has made a certain number of revolutions. A countershaft 41 which is journaled in bearings on the framework B of the machine, is provided with a worm gear 42 that meshes with a worm 43 on the main shaft 6 that actuates the table A, and a pulley 44 which is loosely mounted on said countershaft, drives a belt 45 that passes around a pulley 46 which is connected to the shaft 10 that projects laterally from the end wall 9 of the screen C. A clutch 47 is provided for connecting the pulley 44 to the countershaft 41, and a shifting lever 48 is connected to said clutch so as to move it into and out of engagement with said pulley. The clutch 47 is normally held in engagement with the pulley 44 by means of a spring 49, as shown in Fig. 1, but after the screen C has made a certain number of revolutions the lever 48 is shifted automatically so as to disconnect the clutch 47 from the pulley 44 and cause said pulley to come to rest. The means herein shown for actuating the clutch-shifting lever 48 so as to move the clutch into an inoperative position, consists of a cam disk 50, a gear 51 that carries said disk, and a pinion 52 on the shaft 10 of the screen C that meshes with the gear 51. The cam disk 50 is loosely mounted on the stub shaft $51^a$ that supports the gear 51, and an elongated slot 53 is formed in said cam disk so as to receive the pin 54 that projects laterally from the gear 51, as shown in Fig. 4. The rotary movement of the gear 51 causes the cam disk 50 to revolve with said gear until the cam $50^a$ on said disk strikes against a friction roller 55 on the clutch-shifting lever 48 and moves said lever in the direction that carries the clutch 47 out of engagement with the drive pulley 44, thereby causing the screen C to come to rest. After the operator has connected the frame F containing the empty receptacles E to the table A he actuates a bar or rod 56 so as to shift the cam disk 50 relatively to the gear 51 and thus carry the cam on said disk out of engagement with the roller on the clutch-shifting lever 48, thus permitting the spring 49 to throw the lever 48 in the opposite direction and consequently connecting the drive pulley 44 to the rotating countershaft 41. The slot and pin connection between the cam disk 50 and the gear 51, of course, permits the cam disk to move relatively to said gear, and said cam disk is provided with a lug $50^b$ against which the end of the rod 56 strikes when the operator actuates said rod.

While I have herein shown a driving mechanism for the screen C consisting of a belt and pulleys, I do not wish it to be understood that my invention is limited to such a structure for any suitable type of driving or propelling mechanism could be used for actuating the screen C without departing from the spirit of my invention.

An overflow hopper 57 is preferably formed in the stationary table 2 or in proximity to the reciprocating frame F that carries the receptacles E which the machine fills so as to catch the excess match-splints or those which escape from the receptacles, said overflow hopper being connected by means of a pipe 58 with the vacuum chamber D so that any match-splints which enter said hopper will be drawn back into the vacuum chamber and thereafter fed into the screen C which supplies the match-splints to the reciprocating table A. I also prefer to arrange a cut-off valve 59 in the suction pipe 14 that leads from the vacuum chamber to the suction fan, and connect said cut-off valve by means of links 60 and a bell crank lever 61 with the clutch-shifting lever 48 so as to automatically cut off the supply of match-splints to the vacuum chamber D when the rotary movement of the screen C is discontinued.

A machine of the construction above described can be attended by the same operator who has charge of the match-making machine in which the splints are dipped or converted into match-splints; it insures a sufficient supply of splints always being at hand to keep the hopper of the match-making machine full; it cleans and arranges the splints at practically one operation; it automatically fills receptacles which are of such a construction that the splints can be introduced into the hopper of the match-making machine easily; and it insures keeping the floor in the vicinity of the match-making machine clean and free from loose match-splints.

Having thus described my invention, what I claim as new and desire to secure by Letters Patent is:

1. A match-splint assembling machine comprising a reciprocating table provided with channels, means for supplying match-splints to said table, the table having openings through which the dust, dirt and short splints can escape from said channels, a stationary support arranged adjacent the discharge end of the table, a removable member mounted on said support, means for causing said member to reciprocate with the table, and a plurality of removable receptacles in said member for receiving the splints that are discharged from said table, said receptacles being adapted to be removed from said member and emptied into the hopper of a match-making machine.

2. A match-splint leveling machine, comprising a grooved or channeled table, means for reciprocating said table, a rotatable screen arranged in proximity to said table for delivering match-splints onto same, pneumatic means for drawing splints from a source of supply and delivering them to said screen, means for causing said screen to come to rest automatically after it has made a certain number of revolutions, and means for automatically cutting off the supply of splints to the screen when it comes to rest.

3. A match-splint assembling machine comprising a reciprocating table provided with channels, means for supplying match-splints to said table, the table having openings through which the dust, dirt and short splints can escape from said channels, a stationary support arranged adjacent the discharge end of the table, a removable member mounted on said support, means for causing said member to reciprocate with the table, a plurality of relatively long and narrow receptacles arranged in said member at approximately right angles to the channels on the table for receiving the splints that are discharged from the table, and a removable means detachably connected to said member for dividing each of said receptacles into a plurality of compartments.

4. A machine for the purpose described, comprising a reciprocating table provided with longitudinally extending channels, means for supplying match-splints to said table, a frame detachably connected to one end of said table, a plurality of substantially trough-shaped receptacles arranged in said frame for receiving the match-splints that travel down the channels in said table, said receptacles extending transversely across all of the channels in the table, and a removable partition member carried by said frame and detachably connected to same for dividing each receptacle into a number of compartments.

5. A match-splint-receiving apparatus comprising a frame, a plurality of trough-like receptacles arranged in said frame, a yielding device which tends to hold said receptacles in the frame, a removable partition member that divides each receptacle into a plurality of compartments, a pivotally mounted device on said frame that coöperates with a device on said partition member so as to lock it in the frame, and means for holding said pivotally mounted device in adjusted position.

6. A match-splint-receiving apparatus comprising a rectangular open frame provided with cross-pieces which are notched or stepped, a plurality of trough-like receptacles arranged in said frame on said steps, and a yielding member on said frame which bears against one end of said receptacles and thus tends to hold them in the frame.

7. A match-splint-receiving apparatus comprising a rectangular-shaped frame, a plurality of relatively long and narrow receptacles arranged in said frame, each of said receptacles being open at one end, a yielding member on said frame against which the open ends of said receptacles bear, and a removable partition member detachably connected to said frame and provided with partitions that extend transversely of said receptacles and which are slotted to receive said receptacles.

In testimony whereof I hereunto affix my signature in the presence of two witnesses, this 7th day of March, 1912.

BERNARD G. VAUGHAN.

Witnesses:
JOHN SHERRINGTON SYKES,
H. LESER.

Copies of this patent may be obtained for five cents each, by addressing the "Commissioner of Patents, Washington, D. C."